United States Patent [19]

Sekmakas et al.

[11] 4,110,292

[45] Aug. 29, 1978

[54] PIGMENTED AIR DRYING LATEX PAINTS HAVING SUPERIOR GLOSS

[75] Inventors: Kazys Sekmakas, Chicago; Kenneth K. Hesler, W. Chicago, both of Ill.

[73] Assignee: DeSoto, Inc., Des Plaines, Ill.

[21] Appl. No.: 804,009

[22] Filed: Jun. 6, 1977

Related U.S. Application Data

[63] Continuation-in-part of Ser. No. 589,876, Jun. 24, 1975, Pat. No. 4,058,499.

[51] Int. Cl.$^2$ ............................................. C08L 33/02
[52] U.S. Cl. .................... 260/29.6 RW; 260/29.6 WB
[58] Field of Search ............ 260/29.6 RW, 29.6 WB, 260/29.4 UA, 42.54, 42.55; 106/308 M

[56] References Cited

U.S. PATENT DOCUMENTS

| | | | |
|---|---|---|---|
| 3,150,110 | 9/1964 | Becker et al. | 260/17 R |
| 3,840,487 | 10/1974 | Dyson et al. | 260/29.6 RW |
| 3,844,990 | 10/1974 | Lindemann et al. | 260/42.55 |
| 3,896,070 | 7/1975 | Tummler et al. | 260/29.6 TA |
| 3,919,154 | 11/1975 | Chang et al. | 260/29.4 UA |

*Primary Examiner*—M. J. Welsh
*Attorney, Agent, or Firm*—Dressler, Goldsmith, Clement, Gordon & Shore

[57] ABSTRACT

A high gloss, water base, pigmented latex is provided by grinding a pigment into a water-free solution of a carboxyl-functional addition solution copolymerized copolymer of monoethylenically unsaturated monomers including at least about 10% by weight of monoethylenically unsaturated carboxylic acid in water miscible alcoholic organic solvent, the copolymer being at least partially neutralized at the time of grinding with an hydroxy amine, to render the said copolymer dispersible in water, and thereby form a nonaqueous pigment paste, and then mixing the nonaqueous pigment paste with an air drying aqueous latex of aqueous emulsion copolymerized copolymer particles. The invention includes the latex paint so-produced.

9 Claims, No Drawings

PIGMENTED AIR DRYING LATEX PAINTS HAVING SUPERIOR GLOSS

The present application is a continuation-in-part of our prior copending application Ser. No. 589,876, filed June 24, 1975 and now U.S. Pat. No. 4,058,499.

This invention relates to high gloss, water base, pigmented air drying latex house paints.

Conventional air drying latex paints develop little gloss, as is well known. These conventional latex paints include pigment which is dispersed in the water phase by means of surfactants or wetting agents, and this leads to low gloss. The pigment is quite differently dispersed in this invention, leading to a very significant increase in gloss, as will be illustrated.

In accordance with this invention, a high gloss, water base, pigmented latex is provided by grinding a pigment into a water-free solution of a carboxyl-functional solution copolymerized addition copolymer of monoethylenically unsaturated monomers including at least about 10% by weight of monoethylenically unsaturated carboxylic acid in water miscible organic solvent, especially an alcoholic solvent, the copolymer being at least partially neutralized with an amine, particularly an hydroxy amine, to render the said copolymer dispersible in water, and thereby form a nonaqueous pigment paste, and then mixing the nonaqueous pigment paste with an aqueous latex, which is adapted to provide good film properties upon air drying. The invention includes the latex paint so-produced.

Referring more particularly to the solution copolymerized copolymer of monoethylenically unsaturated monomers containing a high level of carboxyl functionality, any addition copolymer of monoethylenically unsaturated monomers may be used, the usual monomers being acrylic or vinyl acetate, including at least about 10% by weight of monoethylenically unsaturated carboxylic acid. However, in this invention, it is preferred that both the solution copolymer and also the emulsion copolymerized latex copolymer contain a major proportion (more than 50% by weight) of acrylic esters, more particularly constituted by a blend of methyl methacrylate with alkyl acrylate in which the alkyl group contains from 1-8 carbon atoms. Styrene, vinyl toluene, or vinyl acetate may be used in place of the methyl methacrylate, but these are less preferred. Acrylonitrile may also be present. These are nonreactive monoethylenic monomers. Hydroxy functional monomers may also be present, such as 2-hydroxyethyl acrylate, and amide groups are also permissible, such as are provided by acrylamide, methacrylamide, or other monoethylenic carboxylic acid amide.

The copolymers of high acidity are solution copolymers which denotes copolymerization in organic solvent solution. Water miscible organic solvents, and especially alcohols, such as butanol, 2-ethoxy ethanol and 2-butoxy ethanol, are preferably selected in this invention since the copolymer is ultimately dispersed in the aqueous medium provided by the latex.

At least 10%, up to about 40%, of the copolymer is to be constituted by monoethylenically unsaturated carboxylic acid. Many acids are appropriate, particularly acrylic acid. Other appropriate acids are methacrylic acid, crotonic acid, itaconic acid, monobutyl maleate, and the like. Preferred proportions are from 15-30% of the copolymer.

The solution copolymerization which is used is a conventional one which is carried out in solvent solution in the presence of a free radical polymerization catalyst. Preferred water miscible organic solvents are 2-ethoxy ethanol and 2-butoxy ethanol, though numerous others are well known and useful herein, such as isopropanol, acetone, and the like.

The copolymer solution is then at least partially neutralized with an amine, hydroxy amines giving the best results. Neutralization is carried out to the extent needed for subsequent dispersion in water, neutralization to at least about 50% of the acidity of the copolymer being generally contemplated.

While amines, such as triethyl amine or ammonium hydroxide (usually considered an amine in the art of solubilizing carboxyl copolymers) are generally useful, hydroxy amines yield significantly better gloss. Hydroxy amines have the formula:

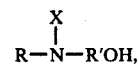

in which R is hydrogen, or an alkyl group, preferably an alkyl group containing 1-4 carbon atoms, R' is an alkylene group, preferably containing 1-4 carbon atoms, and X is either R or R'OH.

Appropriate hydroxy amines are illustrated by propanol amine, diethanol amine, dipropanol amine, dimethyl ethanol amine, dimethyl propanol amine, diethyl ethanol amine, methyl diethanol amine, ethyl diethanol amine, and the like. Tertiary amines containing at least one hydroxy group are particularly contemplated, and the invention will be illustrated using dimethyl ethanol amine.

While any pigment may be included in the paints of this invention, titanium dioxide pigment, both rutile and anatase, are particularly contemplated. The hydroxy amines are especially significant in achieving the effect of dispersion and high gloss containing results contemplated herein when titanium dioxide pigment is relied upon to provide the major proportion of the pigmentation. The proportion of pigment should be sufficient to provide a paste in known fashion. A pigment volume concentration of at least 10% is usual.

After neutralization of at least a portion of the carboxyl functionality contained in the copolymer solution, the pigment is added and conventional grinding is carried out to produce a pigment paste. In preferred practice, from 3-12 parts by weight of pigment are dispered in the copolymer-solvent solution per part of copolymer, more preferably from 5-10 parts of pigment per part of copolymer. The aqueous latex providing the bulk of the resin solids of the paint is then added either directly or after preliminary admixture of a small amount of water, into the neutralized solvent solution.

The neutralized solution of carboxyl-functional solution copolymer preferably contains from 40% to 70% of solvent, based on the weight of the solution copolymer, to provide a viscosity appropriate for grinding in the pigment.

While any conventional air drying emulsion copolymer latex used in the paint industry may be employed herein, vinyl acetate-butyl acrylate copolymers, vinyl acetate-ethylene copolymers, and methyl methacrylate-ethyl acrylate (or butyl acrylate) copolymers illustrate the more usual paint latices, and the methyl methacrylate-acrylic ester copolymers are preferred. In general, aqueous emulsion copolymers having a $T_g$ below 20° C. are useful herein since these provide air dry paints. $T_g$ denotes the glass transition temperature and is well recognized to define the nature of an emulsion copolymer which is not significantly cross-linked in the emulsion. A small amount of coalescing solvent, as is well known, may be present to facilitate air drying. Reactive monomers cannot be present in the large amounts needed for a baking system, for these would have to be reacted in order to provide good film properties, and baking is not available in a house paint. Thus, up to about 1% of a carboxylic monomer may be included for emulsion stability and up to about 2% of amine-functional monomers may be present to maximize adhesion and other properties, but larger amounts of reactive materials should be avoided since these are inconsistent with an air dry latex. The total proportion of reactive monomers should be less than about 4%. The amine functional monomers are illustrated in U.S. Pat. Nos. 3,356,653; 3,356,654; 3,356,655; and 3,509,085.

It is desired to call particular attention to some of the superior attributes which are obtained in pigmented paints formulated in accordance with this invention in comparison with other commercially available semi-gloss paints, aside from the significant improvement in gloss which is obtained. Thus, better visual hiding is obtained at the same level of pigmentation, and the pigment dispersing properties are superior. This enables dispersion in the absence of the surfactants normally introduced to aid in dispersing the pigment. This characteristic is particularly beneficial from the standpoint of processing because in the previous technique of grinding the pigment into water containing a surfactant, foaming was troublesome. Also, and from the product standpoint, higher solids content paints are enabled by this invention. The superior dispersion also enables darker colors using smaller amounts of prime pigment (the titanium dioxide), and the tendency of the pigment to flocculate is avoided.

From the standpoint of application, it has been found that wetting of the substrate is superior and the rheology of the coating is better, causing brush marks to flow out and become less discernible. The better wetting which is obtained enables the formulation of paints in which the polyester component normally introduced to provide the desired chalk penetration can be eliminated. As a result, one can wet chalky surfaces without introducing any tendency to yellow.

It is also possible in this invention to reduce the proportion of titanium dioxide pigment which is needed for hiding, and this can be done by increasing the amount of extender pigment, such as aluminum silicate. This is not possible in the corresponding conventional system where aluminum silicate introduction reduces gloss.

Throughout this specification, and particularly in the examples and claims which follow, all proportions are by weight unless otherwise specified.

EXAMPLE 1 (FOR COMPARISON)

| Charge Composition (Pounds) | |
|---|---|
| 83 | Water |
| 4.5 | Anionic Surfactant - sodium salt of polyacrylic acid (Rohm and Haas Tamol 731 may be used) |
| 125 | Titanium dioxide rutile Disperse the pigment using a high speed mixer Add the following in order |
| 425 | Water |
| 10 | Hydroxy ethyl cellulose } dissolve |
| | thickener |
| 8 | Butyl Carbitol (coalescing agent) |
| 319 | Acrylic Emulsion Polymer (47% solids) - see note 1 |
| 4 | Defoamer (Drew L-475 may be used) |
| 1 | Anionic surfactant (dioctyl sodium sulfosuccinate [60% solids in isopropanel]) |
| | Solids: 28% by weight |
| | Weight per gallon: 9.4 pounds |
| | The formulation contains: |
| | 125 pounds of titanium dioxide pigment |
| | 150 pounds of emulsion polymer solids |

Note 1 - The acrylic emulsion polymer utilized is made in accordance with the teachings of Example 2 of U.S. Pat. No. 3,356,653, and had the following monomer composition:
  53% methyl methacrylate
  44% butyl acrylate
  1% methacrylic acid
  2% amino adduct (see Example 1 of U.S. Pat. No. 3,356,653)
  100%

EXAMPLE 2

Example 1 was repeated, only the 4.5 pounds of the anionic surfactant dispersant and the 83 pounds of water were replaced with 27.2 pounds of water soluble acrylic copolymer solution of Example 3 at 55% solids. The proportion of acrylic emulsion was reduced to maintain the solids content at 150 pounds:

| 135 pounds | 90% | Emulsion polymer solids |
|---|---|---|
| 15 pounds | 10% | Water soluble acrylic polymer solids |

EXAMPLE 3

Example 3

| | | Charge Composition (grams) |
|---|---|---|
| 1080 | 2-Ethoxy ethanol solvent - heat to 120° C. | |
| 360 | Methyl methacrylate | |
| 1700 | Ethyl acrylate | |
| 520 | Acrylic acid | |
| 80 | Benzoyl peroxide Add the above over a three hour period while maintaining temperature at 120° C. Hold one hour and add: | |
| 12 | Tertiary-butyl perbenzote Hold 1½ hours. Start cooling and add: | |
| 370 | 2-Ethoxy ethanol solvent Cool to 70° C. and add the following over a 20 minute period: | |
| 650 | Dimethyl ethanol amine Strain to provide an acrylic copolyer solution: Nonvolatile solids: 55% Viscosity (Gardner) $Z_3$ Acid value (nonvolatiles) 148 | |

Aqueous latex paints prepared in accordance with Examples 1 and 2 were compared as follows:

| Gloss | Example 1 | Example 2 |
|---|---|---|
| 60° Gloss meter reading Dry 1 week at room temperature | 36 | 78 |
| Film Properties | | |
| Scrub resistance | Good | Good |
| Blocking resistance | Good | Good |
| Burnishing resistance | Good | Good |
| Stain removal | Very good | Very good |
| Hiding | Good | Very good |

As will be seen, the invention has been illustrated by a comparison between two similar latex paints, one produced in conventional fashion (Example 1), and the other produced in accordance with the teachings of this invention (Example 2).

The generally superior properties which are produced have been described previously, and the marked increase in gloss (from 36 to 78 measured on a 60° glossmeter) represents a large increase which stands out under the most casual inspection.

The invention is defined in the claims which follow. We claim:

1. A method of producing a high gloss, air drying water base, pigmented latex paint comprising, grinding 3-12 parts of pigment into a water-free solution containing 1 part of an at least partially neutralized carboxyl-functional addition solution copolymerized copolymer of 10% to 40% of monoethylenically unsaturated carboxylic acid, the major proportion of said pigment being titanium dioxide and said solution containing 40% to 70% of alcoholic organic solvent based on the weight of the solution copolymer, said copolymer being at least partially neutralized with an hydroxy amine having the formula:

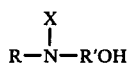

in which R is hydrogen or an alkyl group, R' is an alkylene group, and X is either R or R'OH, to render the said copolymer dispersible in water, and thereby form a nonaqueous pigment paste, and then mixing the nonaqueous pigment paste with an air drying aqueous latex consisting essentially of emulsified aqueous emulsion copolymer particles having a $T_g$ below 20° C., the copolymer of said latex containing less than about 4% of reactive monomers.

2. A method as recited in claim 1 in which said hydroxy amine is a tertiary amine and said R and R' groups contain from 1-4 carbon atoms.

3. A method as recited in claim 2 in which said hydroxy amine is dimethyl ethanol amine.

4. A method as recited in claim 1 in which said solution copolymer contains from 15% to 30% of monoethylenically unsaturated carboxylic acid.

5. A method as recited in claim 1 in which said solution copolymer and said aqueous emulsion copolymer each include more than 50% by weight of a blend of methyl methacrylate and $C_1 - C_8$ alkyl acrylate.

6. A method as recited in claim 1 in which from 5-10 parts of pigment are ground into said water free solution containing 1 part of said at least partially neutralized solution copolymer.

7. A method as recited in claim 6 in which said alcoholic organic solvent consists essentially of 2-ethoxy ethanol and 2-butoxy ethanol.

8. A method as recited in claim 1 in which said aqueous emulsion copolymer consists of a blend of methyl methacrylate and $C_2 - C_4$ alkyl acrylate, up to about 1% of monoethylenic carboxylic acid and up to about 2% of a monoethylenic amine-functional monomer.

9. The high gloss, water base, pigmented air drying latex paint produced by the method of claim 1.

* * * * *